United States Patent
Kimiaeifar et al.

(10) Patent No.: US 12,017,415 B2
(45) Date of Patent: Jun. 25, 2024

(54) WIND TURBINE BLADE LEADING EDGE PROTECTION METHOD

(71) Applicant: Vestas Wind Systems A/S, Aarhus (DK)

(72) Inventors: Amin Kimiaeifar, Silkeborg (DK); Brian Bækdahl Damgaard, Hørning (DK)

(73) Assignee: Vestas Wind Systems A/S, Aarhus N. (DK)

( * ) Notice: Subject to any disclaimer, the term of this patent is extended or adjusted under 35 U.S.C. 154(b) by 332 days.

(21) Appl. No.: 17/617,350

(22) PCT Filed: Jun. 26, 2020

(86) PCT No.: PCT/EP2020/068038
§ 371 (c)(1),
(2) Date: Dec. 8, 2021

(87) PCT Pub. No.: WO2020/260592
PCT Pub. Date: Dec. 30, 2020

(65) Prior Publication Data
US 2022/0258430 A1    Aug. 18, 2022

(30) Foreign Application Priority Data

Jun. 26, 2019   (EP) .................................... 19182545

(51) Int. Cl.
*B29C 65/48*    (2006.01)
*B29C 65/00*    (2006.01)
(Continued)

(52) U.S. Cl.
CPC ............ *B29C 65/485* (2013.01); *B29C 66/02* (2013.01); *B29C 66/038* (2013.01);
(Continued)

(58) Field of Classification Search
CPC ..... B29C 65/485; B29C 66/02; B29C 66/038; B29C 66/114; B29C 66/532; B29C 66/71;
(Continued)

(56) References Cited

U.S. PATENT DOCUMENTS

2007/0036659 A1 * 2/2007 Hibbard ................ B29C 66/303
                                                                    416/233
2016/0039144 A1    2/2016 Windbichler
2016/0046088 A1    2/2016 Haag et al.

FOREIGN PATENT DOCUMENTS

CN    104254687 A    12/2014
CN    108495998 A    9/2018
(Continued)

OTHER PUBLICATIONS

European Patent Office, European Search Report in EP 19182545.4, Nov. 6, 2019.
(Continued)

*Primary Examiner* — Daniel H Lee
(74) *Attorney, Agent, or Firm* — Wood Herron & Evans LLP (57) ABSTRACT

Wind Turbine Blade (12) Leading Edge (24, 30, 88) Protection Method In a first aspect of the invention there is provided a method of applying an erosion shield (22) to a leading edge region (30) of a wind turbine blade (12). The method comprises providing a wind turbine blade (12) comprising a blade shell (26) having an aerodynamic profile and defining a leading edge region (30); providing an erosion shield (22) made of a polymer material, the erosion shield (22) having an inner surface (36) to be bonded to the leading edge region (30) of the blade shell (26), and an outer surface (38, 84, 98) to be exposed in use; activating (44) the inner surface (36) of the erosion shield (22), and cleaning (42) the inner surface (36) of the erosion shield (22) using a solvent. The method further comprises applying a layer of
(Continued)

wet adhesive (66, 68, 72A) to the inner surface (36) of the erosion shield (22); applying a layer of wet adhesive (66, 68, 72A) to the leading edge region (30) of the blade shell (26); arranging the erosion shield (22) against the leading edge region (30) of the blade shell (26) such that wet-to-wet adhesive (66, 68, 72A, 72, 96) contact is established between the inner surface (36) of the erosion shield (22) and the blade shell (26), and curing the adhesive (66, 68, 72A, 72, 96) to bond the erosion shield (22) to the leading edge region (30) of the blade shell (26).

14 Claims, 10 Drawing Sheets

(51) Int. Cl.
| | | |
|---|---|---|
| B29K 675/00 | (2006.01) | |
| B29L 31/08 | (2006.01) | |
| F03D 1/06 | (2006.01) | |

(52) U.S. Cl.
CPC .......... B29C 66/114 (2013.01); B29C 66/532 (2013.01); B29C 66/71 (2013.01); *B29K 2675/00* (2013.01); *B29L 2031/085* (2013.01); *F03D 1/0675* (2013.01); *F05B 2230/90* (2013.01); *F05B 2240/303* (2020.08)

(58) Field of Classification Search
CPC ............. B29C 66/0382; B29C 66/1122; B29C 66/301; B29C 66/324; B29C 66/026; B29C 66/7212; B29C 66/02245; B29C 65/483; B29K 2675/00; B29L 2031/085; F03D 1/0675; F03D 80/50; F03D 1/0633; F03D 13/10; F05B 2230/90; F05B 2240/303; Y02E 10/72

See application file for complete search history.

(56) References Cited

FOREIGN PATENT DOCUMENTS

| | | | | |
|---|---|---|---|---|
| CN | 109790816 A | | 5/2019 | |
| EP | 2927482 A1 | * | 10/2015 | ........... F03D 1/0675 |
| EP | 2927482 A1 | | 10/2015 | |
| EP | 2982490 A1 | * | 2/2016 | ............. B29C 65/48 |
| EP | 2982490 A1 | | 2/2016 | |
| WO | 2014049330 A1 | | 4/2014 | |
| WO | 2016075619 A1 | | 5/2016 | |
| WO | 2018051153 A1 | | 3/2018 | |
| WO | 2019048014 A1 | | 3/2019 | |
| WO | WO-2019048014 A1 | * | 3/2019 | ............... F03D 1/06 |

OTHER PUBLICATIONS

European Patent Office, International Search Report and Written Opinion in PCT/EP2020/068038, Sep. 1, 2020.
China National Intellectual Property Administration, office action issued in corresponding Chinese Application No. 202080055227.X, mailed Apr. 24, 2023, with English translation.

* cited by examiner

WIND TURBINE BLADE LEADING EDGE PROTECTION METHOD

TECHNICAL FIELD

The present invention relates generally to wind turbine blades and more specifically to a method of protecting a leading edge of a wind turbine blade.

BACKGROUND

Wind turbines frequently experience severe weather conditions due to their remote location, particularly in offshore wind installations. Collisions between a wind turbine blade and airborne particles such as rain or hail cause erosion of the blade's surface. Such erosion reduces the blade's smoothness and aerodynamic performance, thereby adversely affecting the annual energy production (AEP) of the wind turbine. As blade lengths increase to capture more energy from the wind, the tip velocity of such blades also increases. At high tip velocities, erosion of the blade surface, particularly at a leading edge of the blade, is exacerbated by the increased impact energy in collisions with airborne particles.

A number of solutions to alleviate leading edge erosion have previously been proposed, including the application of tape, paint, protective coatings or metal shields to the leading edge. A particularly effective solution is the application of a polymer-based protective cover, for example as described in WO2016075619. In practice, such covers are fixed to the leading edge of a blade using a double-sided adhesive tape. However, it has been found that existing methods for affixing such protective covers to the leading edge of a blade are not sufficiently durable and do not have the requisite longevity. In particular, it has been found that protective covers have a tendency to delaminate from the wind turbine blade in an early stage of their projected use-period, thereby leaving the leading edge exposed to erosion. The protective cover may therefore have a limited lifetime in comparison to the projected lifetime of a wind turbine blade.

It is against this background that the present invention has been developed.

SUMMARY OF THE INVENTION

In a first aspect of the invention there is provided a method of applying an erosion shield to a leading edge region of a wind turbine blade. The method comprises providing a wind turbine blade comprising a blade shell having an aerodynamic profile and defining a leading edge region; providing an erosion shield made of a polymer material, the erosion shield having an inner surface to be bonded to the leading edge region of the blade shell, and an outer surface to be exposed in use; activating the inner surface of the erosion shield, and cleaning the inner surface of the erosion shield using a solvent. Preferably, cleaning the inner surface of the erosion shield is performed after activating the inner surface of the erosion shield but cleaning may also be conducted before activating or both before and after activating the inner surface of the erosion shield. The method further comprises applying a layer of wet adhesive to the inner surface of the erosion shield; applying a layer of wet adhesive to the leading edge region of the blade shell; arranging the erosion shield against the leading edge region of the blade shell such that wet-to-wet adhesive contact is established between the inner surface of the erosion shield and the blade shell, and curing the adhesive to bond the erosion shield to the leading edge region of the blade shell.

Activating the inner surface of the erosion shield may comprise abrading said inner surface. The inner surface of the erosion shield may be activated using an abrasive having a grit rating of between 50 and 200, preferably 60 to 120 and more preferably 120. The abrasive may for example be a sanding paper, sanding abrasive mesh or another abrading media. Preferred abrasive is sanding abrasive mesh such as Autonet 120. The inner surface of the erosion shield may be activated by using an orbital sander comprising an abrasive such as Autonet 120. The inner surface of the erosion shield may be cleaned using Isopropyl Alcohol (IPA) or another suitable solvent. A lint free cloth may be used with the IPA or solvent to clean the inner surface of the erosion shield before or after activating the inner surface.

It was found to be highly advantageous that wet-to-wet adhesive contact is established between the whole inner surface of the erosion shield and the blade shell. Particularly, establishing wet-to-wet adhesive contact in only a part of the contact was found to create points that over time may lead to local degradation of the erosion shield or of the adhesive.

Prior to applying the wet adhesive to the leading edge region of the blade shell, the method may comprise activating the leading edge region and cleaning the leading edge region using a solvent. Preferably cleaning the leading edge region is performed after activating the leading edge region, but cleaning may also be conducted before activating or both before and after activating the leading edge region. The leading edge region of the blade shell may be cleaned using Isopropyl Alcohol (IPA). A lint free cloth may be used with the IPA to clean the leading edge region.

The adhesive may be a two-part epoxy adhesive. Preferably the two-part epoxy adhesive may be one of Sikapower 1200, Locktite Hysol EA 9464, or Sikapower 1277.

Prior to arranging the erosion shield against the leading edge region of the blade shell, the method may further comprise applying a length of removable reinforcing tape along a longitudinal edge of the erosion shield to increase the stiffness of said longitudinal edge temporarily during arrangement of the erosion shield and curing of the adhesive. It was found that this reduced the tendency to create wrinkles along the longitudinal edge during arranging of the erosion shield against the leading edge region on the blade shell. Particularly, if adhesive and air is forced towards the longitudinal edge during arranging of the erosion shield for example with a roller or an outer mould part, the erosion shield may deform and create wrinkles along the longitudinal edge, and this may be reduced if the longitudinal edge of the erosion shield is reinforced by a removable tape.

The method may further comprise providing adhesive in a sealing region of the blade shell, the sealing region being defined adjacent to a longitudinal edge of the erosion shield, and shaping the adhesive such that said adhesive forms a smooth transition between the longitudinal edge of the erosion shield and the blade shell. Further, the method may comprise covering the adhesive in the sealing region with a length of removable tape to maintain the shape of the adhesive and smooth transition between the erosion shield and blade shell during curing of said adhesive in the sealing region. Following curing of the adhesive in the sealing region, the length of removable tape may be removed to provide a smooth aerodynamic transition from the outer surface of the erosion shield to the blade shell.

A UV resistant coating may be applied to an outer surface of the adhesive in the sealing region after removing the length of removable tape.

After arranging the erosion shield against the leading edge region of the blade shell, the method may further comprise arranging a bagging film over the erosion shield and/or sealing region, and using a roller to smooth the erosion shield against the leading edge region, squeezing adhesive and air-pockets out from between the inner surface of the erosion shield and the blade shell. The bagging film may be temporarily secured to the blade shell using removable tape. The bagging film may prevent that the erosion shield shifts on the blade shell during and after adhesive and air-pockets are squeezed from between the inner surface of the erosion shield and the blade shell. The bagging film may also prevent that the outer surface of the erosion shield is contaminated by adhesive via the roller. The bagging film may for example be a vacuum bag film material or another transparent sheet material that allows for positioning over the erosion shield without forming of wrinkles.

The erosion shield may be made of a polyurethane material. The erosion shield may have sufficient flexibility such that it conforms to the contour of the leading edge region of the blade shell. Preferably the erosion shield may be a softshell erosion shield. Further, the erosion shield may be elongate and comprise a substantially U-shaped profile. The erosion shield may comprise a substantially uniform cross-sectional profile throughout its longitudinal length.

The erosion shield may comprise a plurality of longitudinally-extending shield sections, and the method may further comprise arranging the shield sections adjacent one another along the leading edge region of the blade shell and forming a butt joint between said adjacent shield sections such that adjacent edges of the adjacent shield sections do not overlap.

The method may further comprise providing adhesive to the butt joint between adjacent edges of adjacent shield sections, covering the adhesive in the butt joint between adjacent shield sections with a strip of removable tape to maintain the shape of the adhesive during curing thereof, and removing said strip of removable tape following curing of the adhesive in the butt joint to provide a smooth aerodynamic transition between the adjacent shield sections. The method may further comprise applying a UV resistant coating to an outer surface of the adhesive in the butt joint following removal of the strip of removable tape.

BRIEF DESCRIPTION OF THE DRAWINGS

The present invention will now be described in further detail, by way of nonlimiting example only, with reference to the following figures, in which:

FIGS. 4a and 4b schematically show the shield being prepared prior to bonding to the blade, in which FIG. 4a shows a surface of the shield being cleaned, and FIG. 4b shows the surface being activated;

FIGS. 7a to 7c are schematic cross-sectional views of a sealing region preparation stage of the method, in which FIG. 7a shows adhesive in the sealing region, FIG. 7b shows a stage wherein the adhesive in the sealing region is shaped, and FIG. 7c shows a length of removable tape applied over the adhesive in the sealing region;

DETAILED DESCRIPTION

Figure 1:
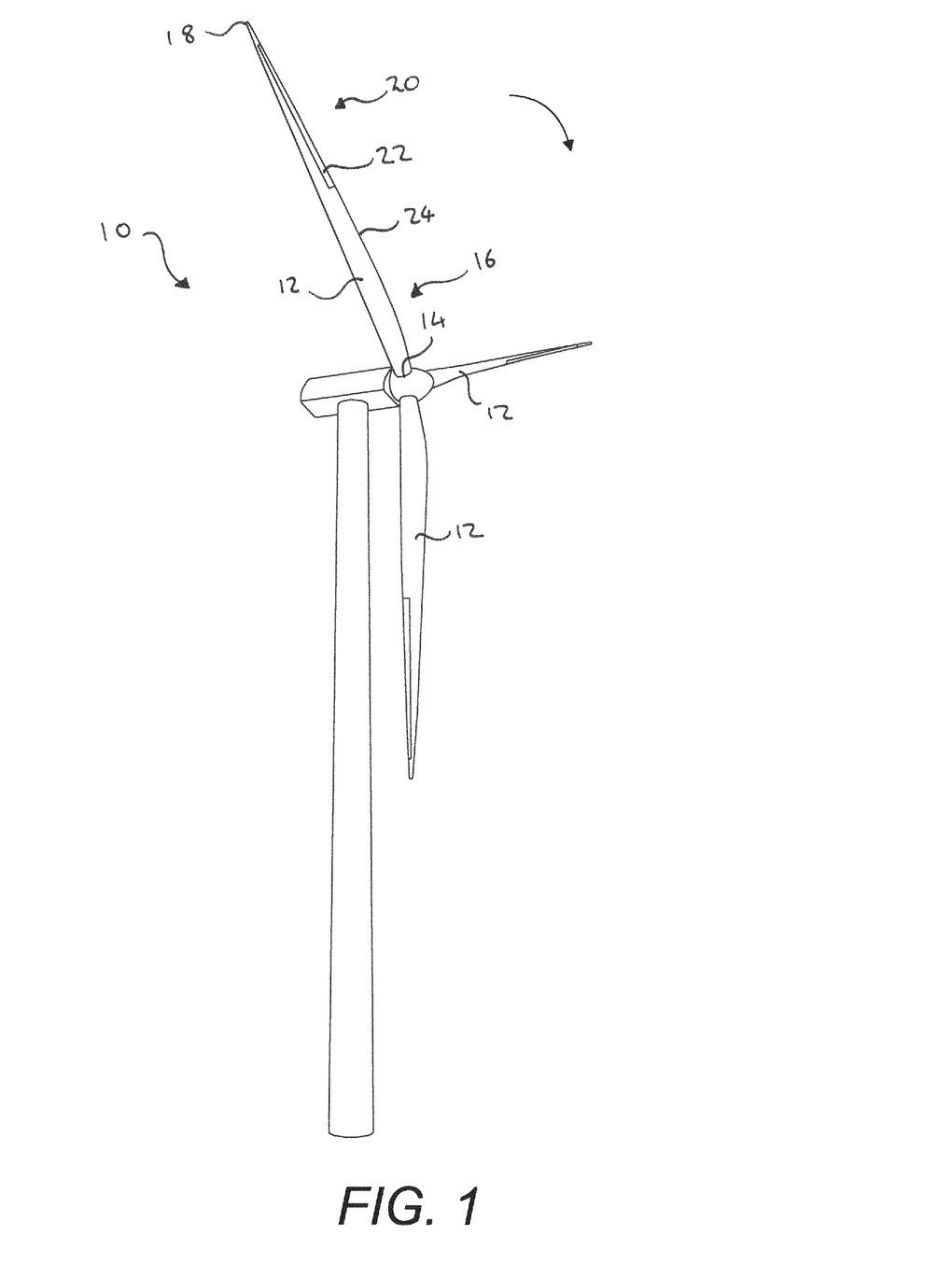
FIG. 1 is a schematic perspective view of a wind turbine.

FIG. 1 is a schematic perspective view of a modern utility-scale wind turbine 10. The wind turbine 10 comprises a plurality of wind turbine blades 12 that extend from a root 14 in an inboard portion 16 of the blade 12, to a tip 18 in an outboard portion 20 of the blade 12. Each wind turbine blade 12 comprises an erosion shield 22 arranged at a leading edge 24 of the blade 12. Although the erosion shield 22 is arranged in the outboard portion 20 of the blade 12 in this example, the invention is not limited in this respect and an erosion shield 22 may be arranged in the inboard portion 16 or extending along substantially the entire leading edge 24 of a turbine blade 12.

The erosion shield 22 provides protection for the leading edge 24 in use where collisions between the blade 12 and airborne particles such as rain and hail cause erosion. Such erosion would otherwise adversely affect the aerodynamic performance of the blade 12 and thereby reduce annual energy production (AEP) of the wind turbine 10. In some cases, leading edge erosion can result in AEP losses of up to 5%.

Figure 2:
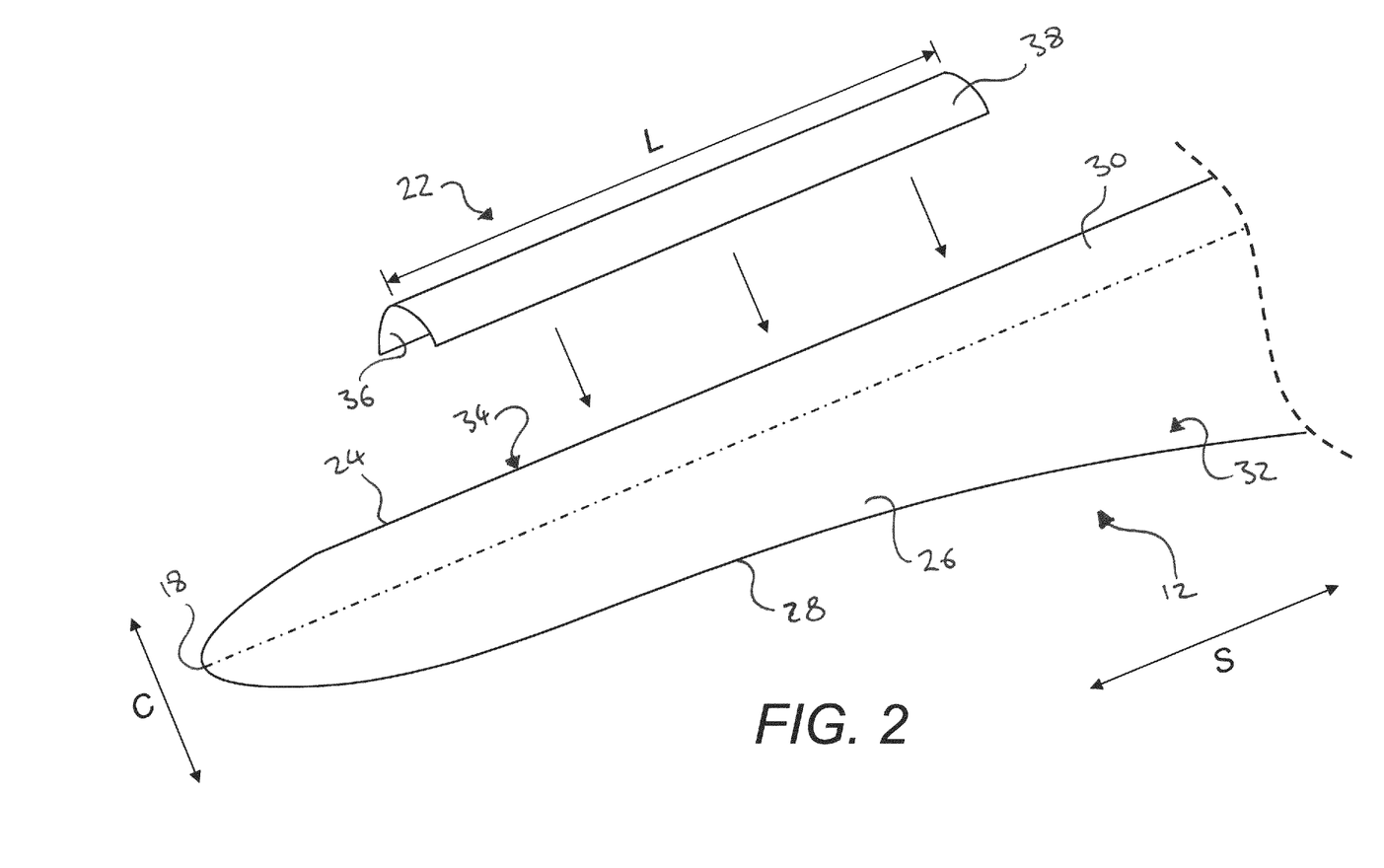
FIG. 2 is a schematic perspective view of a portion of a wind turbine blade and an erosion shield.

FIG. 2 is a schematic perspective view of a portion of a wind turbine blade 12 and an erosion shield 22. The blade 12 comprises a blade shell 26 which may be made from composite material, e.g. glass fibre reinforced plastic (GFRP), and manufactured using methods known in the art such as lamination of composite layers in a resin matrix. The blade shell 26 has an aerodynamic profile and extends in a spanwise direction (S) between the blade root 14 and the tip 18 of the blade 12, and in a chordwise direction (C) between the leading edge 24 and a trailing edge 28 of the blade 12.

A leading edge region 30 is defined by the leading edge 24 and extends along substantially the entire spanwise length of the leading edge 24. The leading edge region 30 spans the leading edge 24 of the blade 12 and comprises a portion of the blade shell 26 immediately adjacent the leading edge 24 on windward and leeward sides 32, 34 of the blade 12. In the example of FIG. 2, the leading edge region 30 extends from the leading edge 24 by substantially equal amounts in the chordwise direction (C) on each of the windward and leeward sides 32, 34 of the blade 12.

In this example, the erosion shield 22 is a so called 'softshell' shield and is formed of a sufficiently flexible material to allow the shield 22 to conform to the contour of the leading edge region 30 of the blade shell 26. To offer optimal flexibility for fitting the shield 22 to a blade 12, as well as optimal wear resistant properties, the erosion shield 22 is made of a polymer material, such as a polyurethane material for example.

The erosion shield 22 is elongate and comprises a substantially U-shaped profile. The erosion shield 22 is preformed into said U-shaped profile to approximate the profile of the blade shell 26 in the leading edge region 30. In this example, the erosion shield 22 comprises a substantially uniform cross-sectional profile throughout its longitudinal length L. In other examples, the erosion shield 22 may not be pre-formed. For example, the erosion shield 22 may be a substantially planar component having sufficient flexibility such that, when applied to a leading edge region 30 of a wind turbine blade 12, the planar shield 22 wraps around the leading edge 24 and assumes the profile of the blade shell 26 in the leading edge region 30.

The erosion shield 22 comprises an inner surface 36 to be bonded to the leading edge region 30 of the blade shell 26, and an outer surface 38 which is exposed in use. The inner and outer surfaces 36, 38 are defined with respect to the configuration of said surfaces following application of the erosion shield 22 to the leading edge region 30 of the blade shell 26. The inner surface 36 is defined as the surface of the erosion shield 22 facing the leading edge region 30 of the blade shell 26 when the shield 22 is applied to the leading edge 30 of a wind turbine blade 12. It follows that the outer surface 38 is the surface that faces away from the blade shell 26, i.e. the outward facing surface 38 of the erosion shield 22 which is exposed to airborne particles such as rain and hail in use.

Known methods of affixing erosion shields 22 to the leading edge region 30 of a wind turbine blade 12 do not achieve a sufficiently durable bond between said shield 22 and the wind turbine blade 12. In use, delamination of an erosion shield 22 from a wind turbine blade 12 is common, because the adhesive bond between the erosion shield 22 and blade shell 26 fails far sooner than the projected lifetime of the shield 22. As will now be described by way of example with reference to FIGS. 3 to 9, the present invention provides an improved method of applying an erosion shield 22 to the leading edge region 30 of a wind turbine blade 12.

Figure 3:
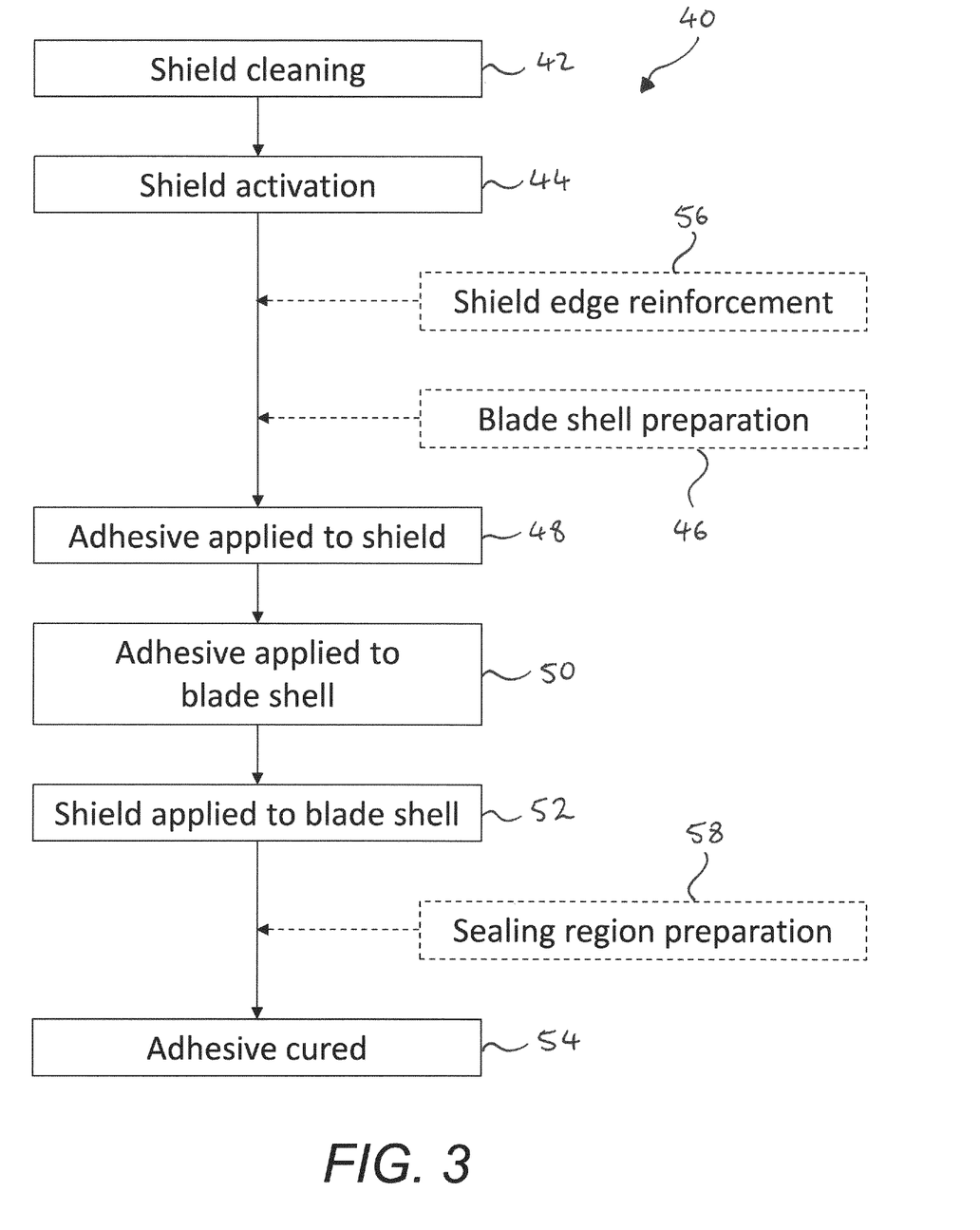
FIG. 3 is a flow chart illustrating stages involved in a method of applying an erosion shield to a leading edge region.

FIG. 3 is a flow chart 40 illustrating stages involved in the application of an erosion shield 22 to the leading edge region 30 of a wind turbine blade 12 in accordance with an example of the present method. Unless otherwise stated, it will be appreciated that the stages of the method may be performed in any suitable order and the invention is not limited to the specific order shown in FIG. 3.

Referring to FIG. 3, the method of applying the erosion shield 22 to the wind turbine blade 12 commences with preparation of the shield's inner surface 36 prior to application of adhesive. As will be described in more detail later, this preparation involves a cleaning stage 42 followed by an activation stage 44. In parallel with this, the blade shell 26 may be prepared 46. Wet adhesive is then applied to the shield 22, and further wet adhesive is applied to the blade shell in stages marked 48 and 50 respectively. The shield 22 is then applied to the blade shell 26 in the stage marked 52, to establish wet-to-wet surface contact between the shield 22 and the blade shell 26. The adhesive subsequently cures 54. These steps will now be discussed in detail, together with optional steps of the method, which are illustrated by the dashed-line boxes 46, 56 and 58 in FIG. 3. Applying the adhesive to each of the shield and the blade shell facilitate easy control of full covering of the surfaces and eventually wet-to-wet contact between the whole inner surface of the erosion shield and the blade shell.

Figure 4A:
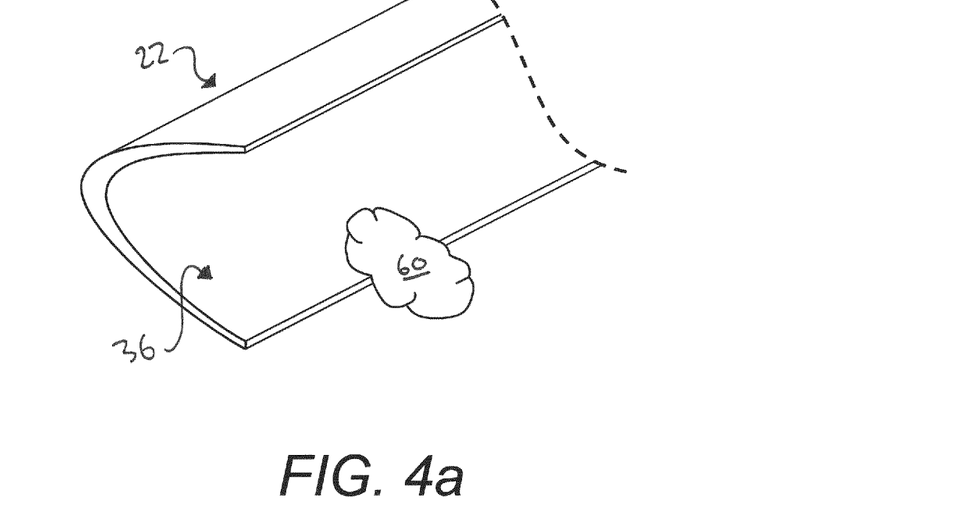

FIG. 4a is a schematic perspective view of an erosion shield 22 during the shield cleaning stage 42. The inner surface 36 of the shield 22 is cleaned using a solvent. In this example, the solvent used for cleaning the inner surface 36 is Isopropyl Alcohol (IPA). As shown in FIG. 4a, a lint free cloth 60 saturated in IPA may be used to clean the inner surface 36 of the erosion shield 22.

The shield cleaning stage 42 of the present application method is influential in achieving sufficient adhesion between the erosion shield 22 and the leading edge region 30 of the blade shell 26. Any number of contaminants or foreign particles may be present on the inner surface 36 of the erosion shield 22 following the manufacture of said shield 22. Such contaminants or foreign particles significantly impact the adhesion of an erosion shield 22 to the leading edge region 30, and in use can lead to the shield 22 becoming detached from the wind turbine blade 12 prematurely.

In the case of moulded polymer erosion shields 22, it is common practice to use a release agent in the mould to facilitate removal of the shield 22 from the mould. Typical release agents include silicon-based release agents. However, it has been found that residuals of these release agents tend to remain on the surface 36 of the shield 22 and impair the adhesion between the shield 22 and the blade shell 26. The cleaning step 42 of the present method ensures that any contaminants or residuals, and in particular residual mould release agents, are removed from the shield 22. Cleaning the inner surface 36 of the erosion shield 22 can therefore be defined as the removal of residuals from the preparation of the erosion shield 22.

Figure 4B:
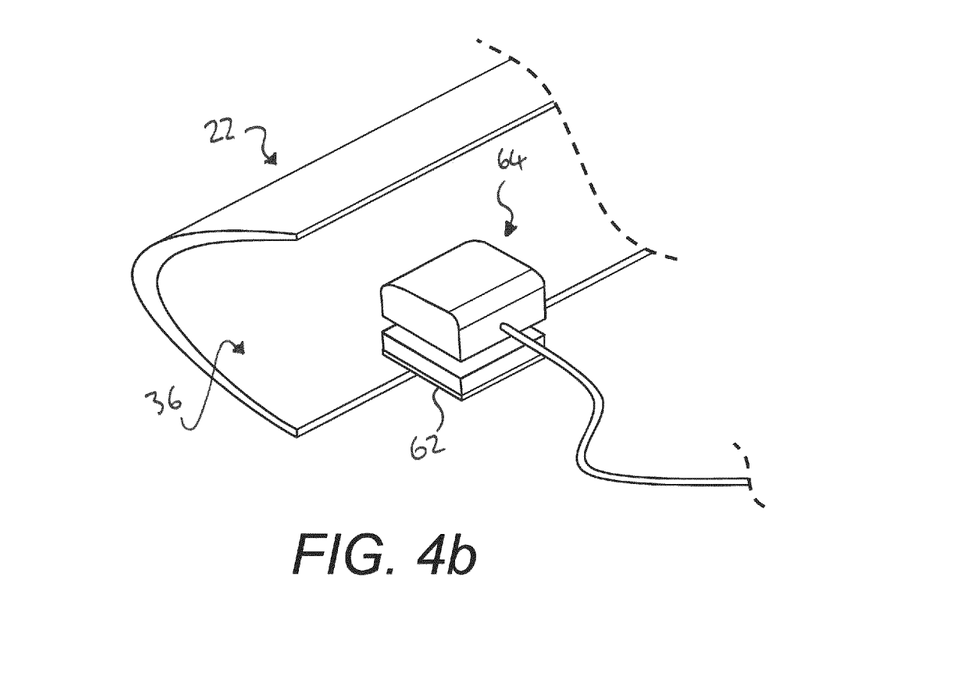

FIG. 4b shows a schematic perspective view of the shield activation stage 44 of the application method following the shield cleaning stage 42. After cleaning the inner surface 36 of the erosion shield 22 using a solvent, said inner surface 36 is activated. In the example shown in FIG. 4b, activating the inner surface 36 comprises abrading said inner surface 36 to increase the surface roughness thereof.

Thorough experimentation comprising activation of the inner surface 36 using abrasives having a wide range of grit ratings revealed that activating the inner surface 36 using an abrasive 62 having a grit rating of between 100 and 200 provides particularly advantageous adhesion between the erosion shield 22 and the blade shell 26. It has been found that optimal adhesion is achieved when activation of the inner surface 36 comprises abrading said surface 36 using an abrasive 62 having a grit rating of 120, such as Autonet 120. As shown in FIG. 4b, an orbital sander 64 comprising an abrasive 62 such as Autonet 120 may be used to activate the inner surface 36 by abrasion.

Conducting the cleaning and activation stages 42, 44 in the order described above (i.e. cleaning before activating) leads to the surprising effect that the adhesion between an erosion shield 22 and the leading edge region 30 of a wind turbine blade 12 is significantly increased. Known methods for applying an erosion shield 22 to a blade shell 26 do not conventionally comprise cleaning the inner surface 36 of said erosion shield 22 prior to activation thereof. In known methods where a cleaning stage does occur, this is commonly included to clean any particles created during an activation stage if such a stage is also implemented.

If the inner surface 36 of the erosion shield 22 is not cleaned prior to activation, contaminants or residuals of release agents may be spread or become embedded in the surface 36 during activation 44, such that a subsequent cleaning stage would not remove said contaminants or residuals of release agents. Conducting the cleaning and activation stages 42, 44 in the above described order therefore advantageously provides increased adhesion between the erosion shield 22 and blade shell 26 in comparison to existing methods.

Figure 5A:
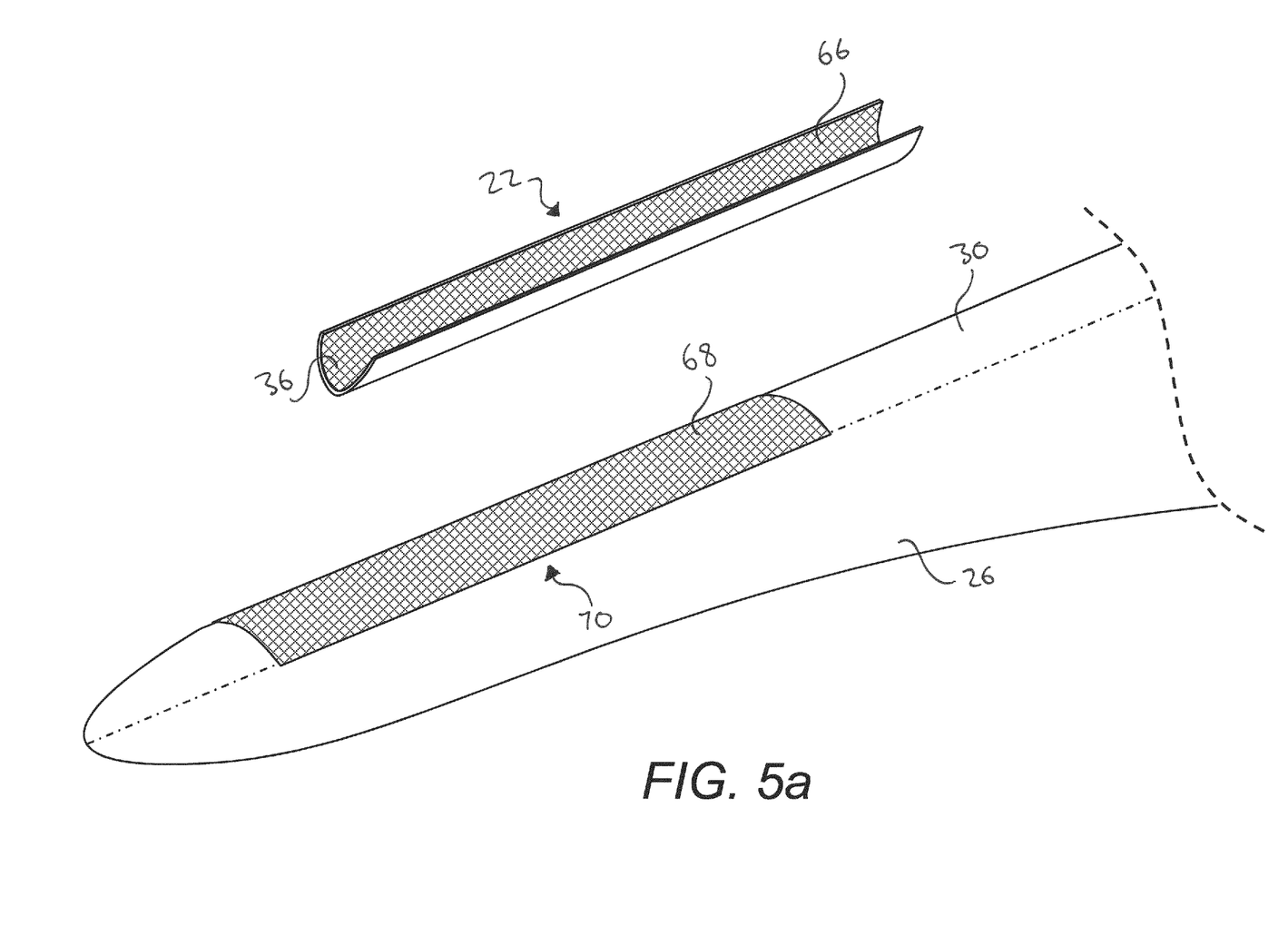
FIG. 5a schematically shows adhesive applied to the erosion shield and to the blade.

FIG. 5a shows a schematic perspective view of stages 48 and 50 of the application method wherein a layer of wet adhesive 66, 68 is applied to both the inner surface 36 of the erosion shield 22 and the leading edge region 30 of the blade shell 26 respectively. In stage 48, the wet adhesive 66 is applied to the erosion shield 22 such that substantially the entire inner surface 36 comprises a layer of wet adhesive 66. Similarly, in stage 50 the adhesive 68 is applied to the leading edge region 30 of the blade shell 26 such that substantially an entire portion 70 of the leading edge region 30 to which the erosion shield 22 will be arranged comprises a layer of wet adhesive 68. Each of the inner surface 36 of the erosion shield 22 and the portion 70 of the leading edge region 30 of the blade shell 26 are wet-out in the application of the respective wet adhesive layers 66, 68, ensuring a consistent and thorough surface coverage is achieved.

Preferably, the wet adhesive layers 66, 68 are applied such that there is no surface-to-air contact on inner surface 36 of the erosion shield 22 and the leading edge region 30 of the blade shell 26. In applying the adhesive 66, 68, care is taken to ensure that the layer of adhesive 66, 68 on each of the shield inner surface 36 and the leading edge region 30 does not comprise air bubbles or other regions where adhesive is not present. The quality of the adhesive application may be quantified in that for each of the adhesive layers 66, 68, there may be a total area of less than 50 mm$^2$, preferably less than 20 mm$^2$, most preferably less than 10 mm$^2$ and optimally less than 1 mm$^2$ wherein there is air contact between the underlying inner surface 36 of the shield 22 or the blade shell 26.

By 'wet adhesive' it will be understood that the adhesive 66, 68 is a liquid adhesive. The wet adhesive 66, 68 is preferably a two-part epoxy adhesive. Through experimentation it has been found that Sikapower 1200, Locktite Hysol EA 9464 and Sikapower 1277 provide particularly advantageous results in terms of erosive wear of the erosion shield 22 and in terms of adhesion between said shield 22 and the blade shell 26. The wet adhesive layers 66, 68 therefore preferably comprise one of the above mentioned two-part epoxy adhesives.

The selection of adhesive is critical to the performance of the erosion shield 22. It has been found that the above referenced adhesives offer optimal adhesion with complementary stiffness characteristics to dissipate the impact energy of incident airborne particles colliding with the erosion shield 22. Whilst an erosion shield 22 can aid in dissipating the impact energy of incident airborne particles, bonding the erosion shield 22 to the blade shell 26 using an adhesive having high stiffness can result in an erosive effect known as drumming, wherein some of the impact energy is transmitted through the adhesive layer 66, 68 and into the blade shell 26. Drumming can lead to delamination of the erosion shield 22 from the blade shell 26, or initiate early erosion of the shield 22, which may progress further to the blade shell 26.

An adhesive having too low a stiffness can also cause drumming as the adhesive layer 66, 68 and erosion shield 22 do not absorb and dissipate enough of the impact energy. It is therefore important that an adhesive complementary to the erosion shield 22 in terms of adhesion and stiffness characteristics is applied to the shield's inner surface 36 and the blade shell 26.

It has been found that a synergistic effect lies in the above described stages 42, 44, 48 and 50 of the method. By preparing the inner surface 36 of the erosion shield 22 in the manner described above, first cleaning 42 and then activating 44 said surface 36, and by applying a layer of wet adhesive 66, 68 to both the erosion shield 22 and the blade shell 26, adhesion between the erosion shield 22 and the blade shell 26 is greatly improved whilst erosive wear as a result of drumming is dramatically reduced.

In some examples, the method may further comprise a blade shell preparation stage 46 prior to applying the wet adhesive 68 to the leading edge region 30. The leading edge region 30 of the blade shell 26 is activated and said region 30 is subsequently cleaned using a solvent to remove any particles created during activation. The leading edge region 30 may be cleaned using Isopropyl Alcohol (IPA), and cleaning said region 30 may comprise using a lint free cloth saturated with IPA.

Figure 5B:
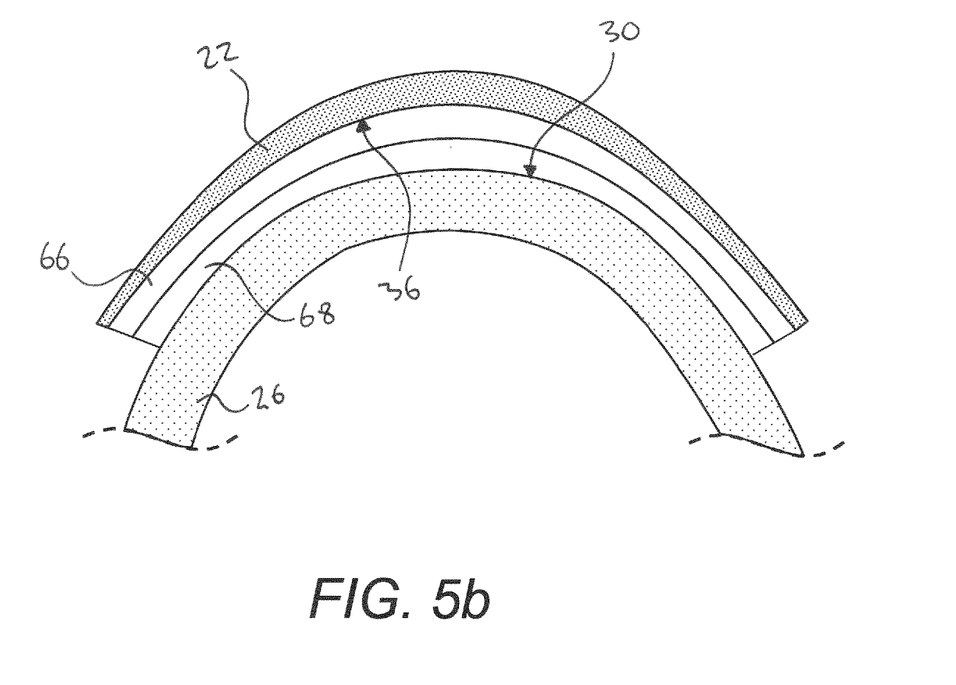
FIGS. 5b and 5c are schematic cross-sectional views of the erosion shield arranged against the blade.

FIG. 5b is a schematic cross-sectional view of the stage of the application method marked 52, wherein the erosion shield 22 is applied to the blade shell 26 by arranging said shield 22 against the leading edge region 30. The erosion shield 22, comprising a layer of wet adhesive 66 on the inner surface 36, is arranged with the leading edge region 30, also comprising a layer of wet adhesive 68, such that wet-to-wet adhesive contact is established between the inner surface 36 of the erosion shield 22 and the blade shell 26.

By wet-to-wet adhesive contact, it is meant that the wet adhesive 66 on the erosion shield 22 is brought into contact with the wet adhesive 68 on the blade shell 26. Wet-to-wet contact advantageously ensures that at least one layer of adhesive 66, 68 is present between the erosion shield 22 and blade shell 26 when the shield 22 is arranged against the leading edge region 30. Preferably, this leads to that pores and air-pockets only may appear inside the adhesive and not at the interface between the blade shell 26 and the wet adhesive 68 on the blade shell or at the interface between the erosion shield and the wet adhesive 66 on the erosion shield. In some existing methods, erosive wear as a result of drumming is particularly severe in 'dry spot' locations where no adhesive is present between the erosion shield 22 and blade shell 26. The wet-to-wet adhesive contact minimizes the effect of any small pores or air bubbles present in one of the adhesive layers 66, 68 as the adhesive in the other of the adhesive layers 68, 66 fills any such small pores or air pockets such that no dry spot locations exist.

Figure 5C:
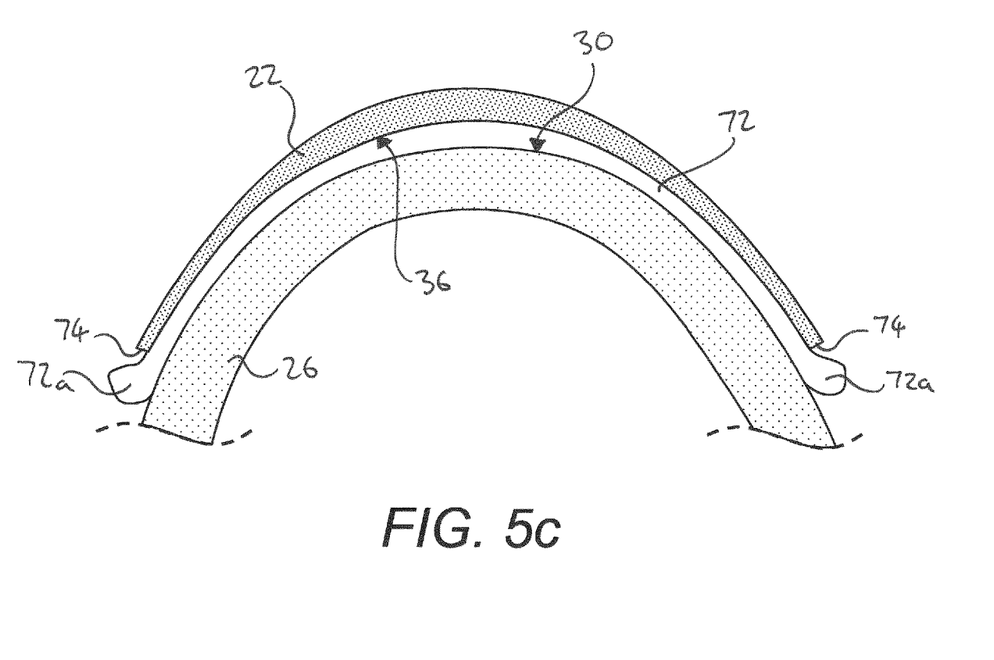

FIG. 5c shows the erosion shield 22 arranged against the leading edge region 30 of the blade shell 26 in a schematic cross-sectional view. After the wet-to-wet adhesive contact is established, as shown in FIG. 5b, the erosion shield 22 is pressed against the leading edge region 30 of the blade shell 26. The layer of wet adhesive 66 on the erosion shield's inner surface 36 and the layer of wet adhesive 68 on the leading edge region 30 combine to form a single homogenous layer of adhesive 72 between the erosion shield 22 and the blade shell 26. Air-pockets in or between the adhesive layers 66, 68 may be squeezed out from beneath the erosion shield 22 when pressing said shield 22 against the blade shell 26. In pressing the shield 22 against the blade shell 26, some adhesive 72a may squeeze out from beneath the erosion shield 22. This adhesive 72a may be used to form a seal along a longitudinal edge 74 of the erosion shield 22 as described below with reference to FIGS. 7a to 7c.

By applying adhesive 66, 68 to both the erosion shield 22 and the blade shell 26, and pressing these together such that a single homogenous adhesive layer 72 is formed between substantially the entire inner surface 36 of the erosion shield 22 and the blade shell 26, the occurrence of dry spots is minimized. As such, erosive wear as a result of drumming, which as discussed above is particularly severe in dry spot locations, is also minimized. The previously described synergistic effect in preparing the shield 22 for bonding by cleaning 42 and then activating 44, and applying a wet adhesive layer 66, 68 to both the shield's inner surface 36 and the leading edge region 30, both significantly increases adhesion between the shield 22 and blade shell 26, and reduces the effect of drumming. This results in a far more durable leading edge protection solution than other known methods.

The stage of the application method marked 54 on FIG. 3 comprises curing the adhesive 72 to bond the erosion shield 22 to the leading edge region 30 of the blade shell 26. By 'curing' it is meant that the adhesive 72 hardens to form an adhesive bond affixing the erosion shield 22 to the blade shell 26. The adhesive 72 may be cured by ambient temperatures following arrangement of the erosion shield 22 with the leading edge region 30. Alternatively, the adhesive 72 may be cured by the application heat, for example by means of a heating blanket arranged over the erosion shield 22.

Figure 6:
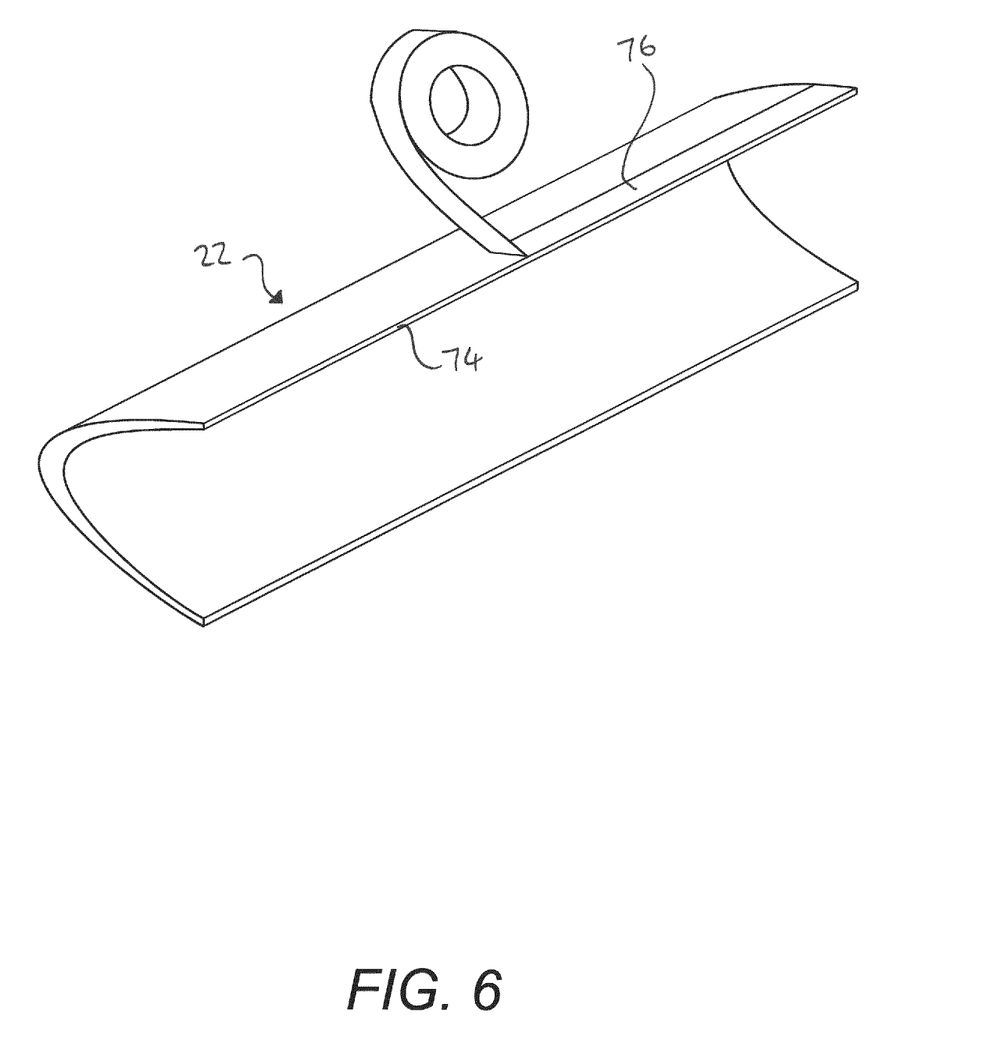
FIG. 6 schematically shows a length of reinforcing tape being applied to an edge of the erosion shield.

FIG. 6 is a schematic perspective view of an erosion shield 22 during a shield edge reinforcement stage 56 included in some examples of the application method. The shield edge reinforcement stage 56 comprises applying a length of removable reinforcing tape 76 along a longitudinal edge 74 of the erosion shield 22 prior to arranging the erosion shield 22 against the leading edge region 30. The removable reinforcing tape 76 is applied in order to temporarily increase the stiffness of a given longitudinal edge 74 of the erosion shield 22. The reinforcing tape 76 prevents the shield 22 from wrinkling e.g. by local deformation during application of the shield 22 to the blade shell 26 and during curing of the adhesive 72. Such wrinkles at the longitudinal edge 74 of a shield 22 could otherwise adversely affect the aerodynamic performance of the blade 12 to which the shield 22 is applied. The reinforcing tape 76 is removed after the adhesive 72 has cured and the erosion shield 22 is affixed to the leading edge region 30.

Figure 7A:
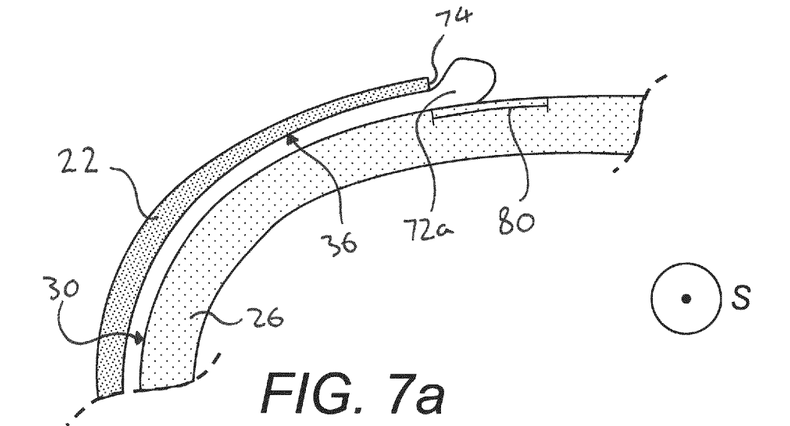

FIG. 7a is a schematic cross-sectional view of the blade shell 26 with an erosion shield 22 arranged against the leading edge region 30 following the stage of the method marked 52. As briefly discussed above with reference to FIG. 5c, some adhesive 72a may be squeezed from beneath the erosion shield 22 when arranging said shield 22 against the blade shell 26. There now follows a refinement to the method, wherein said squeezed adhesive 72a is used to form a seal 78 along a longitudinal edge 74 of the erosion shield 22.

As indicated by reference numeral 80 on FIG. 7a, a sealing region 80 of the blade shell 26 is defined adjacent to a longitudinal edge 74 of the erosion shield 22. The sealing region 80 extends in the spanwise direction (S) on the blade shell 26 along substantially the entire length of the longitudinal edge 74 of the erosion shield 22, perpendicular to the plane of the page on FIG. 7a. In some examples, the sealing region 80 is specifically defined between the longitudinal edge 80 and a length of removable tape (not shown) arranged on the blade shell 26. In such an example, the length of removable tape is arranged substantially parallel to, and spaced apart from, the longitudinal edge 74 of the erosion shield 22.

Adhesive 72a is provided in the sealing region 80 of the blade shell 26. In some examples, excess adhesive 66, 68 may be applied to the inner surface 36 of the erosion shield 22 and the leading edge region 30 of the blade shell 26. In such an example, some adhesive 72a may be squeezed from between the shield's inner surface 36 and the leading edge region 30 and into the sealing region 80 upon arranging the erosion shield 22 against the blade shell 26. Alternatively, additional adhesive may be applied to the sealing region 80 following arrangement of the erosion shield 22.

Figure 7B:
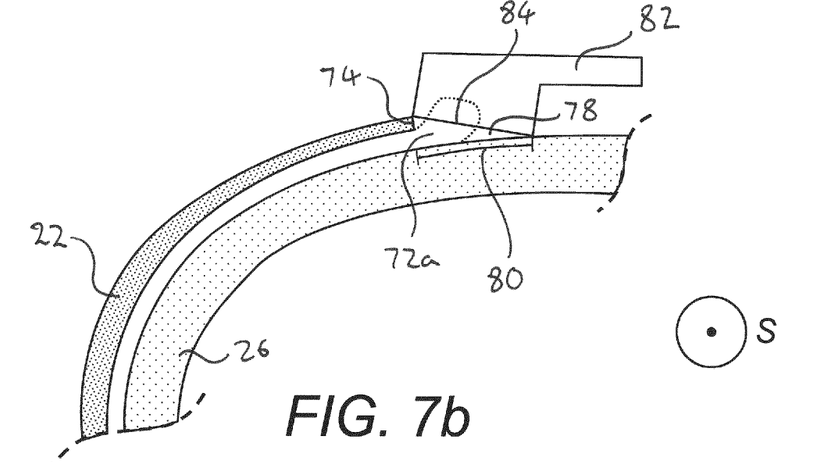

FIG. 7b shows a further step in the sealing region preparation stage 58. The adhesive 72a in the sealing region 80 is shaped to form a smooth transition between the longitudinal edge 74 of the erosion shield 22 and the blade shell 26. Alternatively, the adhesive 72a in the sealing region 80 is shaped to form a smooth transition between the longitudinal edge 74 of the erosion shield 22 and the length of removable tape if used on the blade shell 26 to demarcate the sealing region 80. The adhesive 72a is shaped using a forming tool 82 to scrape the adhesive 72a along the sealing region 80 in the spanwise direction (S) to fill said sealing region 80 and provide a smooth outer surface 84 on the adhesive 72a. The dotted line on FIG. 7b shows the adhesive 72a in the sealing region 80 prior to being shaped, illustrating the difference in profile of the adhesive 72a following shaping thereof for comparison.

In some known methods, a sealant is applied to the longitudinal edge 74 of the erosion shield 22 in the sealing region 80. It has been found that the sealant erodes away relatively quickly in use, reducing aerodynamic performance of the blade 12. Providing adhesive 72a in the sealing region 80 is advantageous as the adhesive 72a has a greater resistance to erosive wear than a sealant. In examples where adhesive 72a squeezed from beneath the erosion shield 22 is provided in the sealing region 80, a more time-efficient method of applying an erosion shield 22 is facilitated, comprising fewer stages and materials than known methods.

Figure 7C:
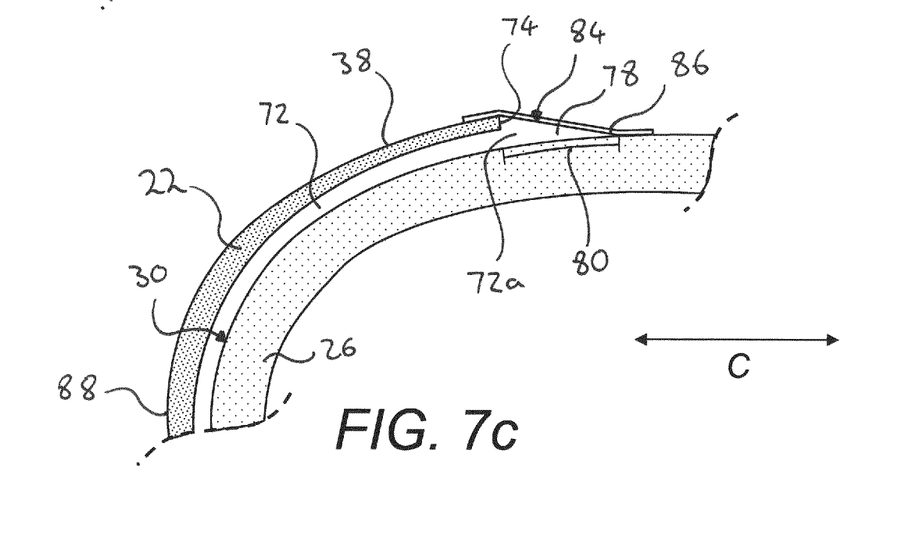

FIG. 7c shows yet a further step in the sealing region preparation stage 58. Adhesive 72a in the sealing region 80 is covered by a length of removable tape 86 to maintain the shape of the adhesive 72a and the smooth transition between the erosion shield 22 and blade shell 26 during curing of said adhesive 72a. The outer surface 84 of the adhesive 72a is thereby protected during curing of the adhesive 72a, enabling a smooth outer surface 84 to be achieved even when applying the erosion shield 22 to the leading edge region 30 in poor weather conditions.

In some examples, the length of removable tape 86 is sufficiently transparent to enable inspection of the adhesive 72a in the sealing region 80 to ensure no air-pockets or other defects are present in the adhesive 72a in the sealing region 80.

After the adhesive 72a in the sealing region 80 has cured, the length of removable tape 86 is removed to provide a smooth aerodynamic transition from the outer surface 38 of the erosion shield 22 to the blade shell 26. In some examples, a UV resistant coating is applied to the outer surface 84 of the adhesive 72a after removing the length of tape 86. The UV resistant coating prolongs the lifetime of the adhesive 72a by blocking UV radiation in sunlight which could cause exposed adhesive to become brittle and susceptible to erosive wear. Surprisingly, it was wound that using a combination of a non-UV resistant adhesive with a UV resistant coating applied to the sealing region provided better overall performance of the erosion shield as a better fit of properties of the adhesive was possible when using a non-UV resistant adhesive than if limited to UV resistant adhesives.

In some examples, the method may comprise an additional stage of applying a bagging film (not shown) over the erosion shield 22 and sealing region 80 after arranging the shield 22 with the leading edge region 30. The bagging film helps to hold the erosion shield 22 in position on the leading edge region 30 prior to the adhesive 72 curing. The bagging film may be temporarily secured to the blade shell 26 or the erosion shield 22 with removable tape or with a pressure sensitive adhesive on at least a part of the surface of the bagging film connected to the blade shell 26 or the erosion shield 22.

With bagging film arranged over the shield 22 and sealing region 80, a roller may be used to squeeze adhesive 72 and air-pockets out from beneath the inner surface 36 of the erosion shield 22. Adhesive 72 from between the erosion shield 22 and leading edge region 30 may thereby be provided in the sealing region 80. Advantageously, use of the bagging film prevents any transfer of adhesive 72a from the sealing region 80 to the roller as the wet adhesive 72a is contained beneath the bagging film. The roller may therefore be used to thoroughly smooth the erosion shield 22 against the leading edge region 30, rolling in the chordwise direction (C) from a leading edge 88 of the shield 22 up to and beyond a respective longitudinal edge 74, and over the sealing region 80 without picking up adhesive 72a and transferring it to the outer surface 38 of the erosion shield 22. Following smoothing of the erosion shield 22 to remove air-pockets beneath the shield 22 and provide adhesive 72a to the sealing region 80, the bagging film is removed.

Figure 8:
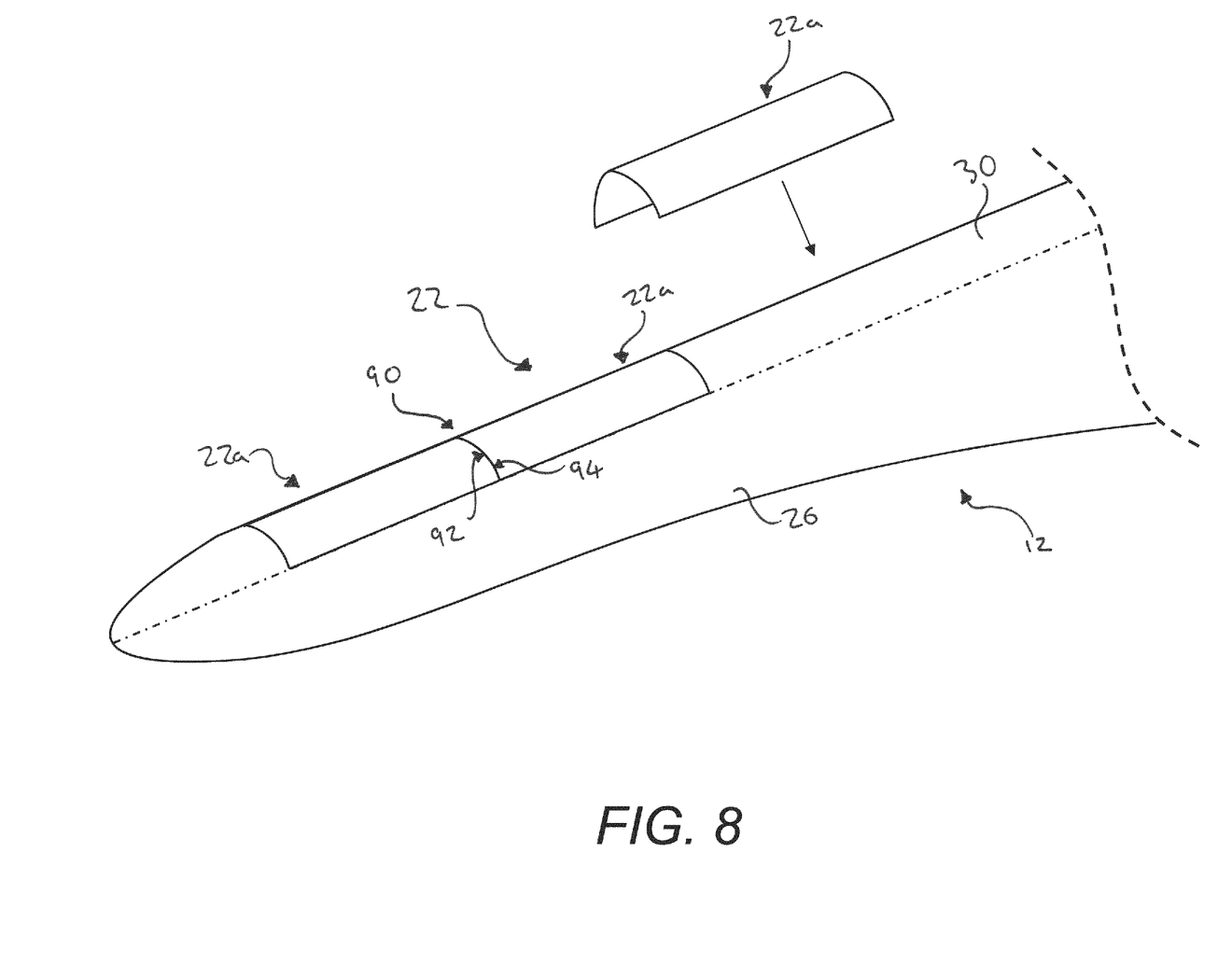
FIG. 8 is a schematic perspective view of a wind turbine blade during application of an erosion shield comprising a plurality of shield sections.

FIG. 8 is a schematic perspective view of a wind turbine blade 12 during application of an erosion shield 22 in accordance with another example of the method. In this example, the erosion shield 22 comprises a plurality of longitudinally-extending shield sections 22a. As shown in FIG. 8, the method further comprises arranging the shield sections 22a adjacent one another against the leading edge region 30 of the blade shell 26. The shield sections 22a are arranged such that a butt joint 90 is formed between adjacent edges 92, 94 of adjacent shield sections 22a.

The adjacent edges 92, 94 of adjacent shield sections 22a do not overlap. It has been found that erosive wear of an erosion shield as a result of drumming is particularly severe in overlapping regions of adjacent shield sections of known leading edge protection methods. In such known methods, adhesive may be applied between overlapping portions, resulting in a sandwich structure of adhesive layers and erosion shield material at an interface between adjacent shield sections. The impact energy of airborne particles incident on the leading edge region of the blade shell is dissipated less effectively due to the increased rigidity in such a region of the erosion shield, resultant from the additional adhesive and shield material layers. As such, the adverse effects of drumming are exacerbated and early erosion of the shield is initiated. The present application method, comprising the formation of a butt joint 90 between adjacent shield sections 22a, therefore provides an improved leading edge protection solution.

Figure 9:
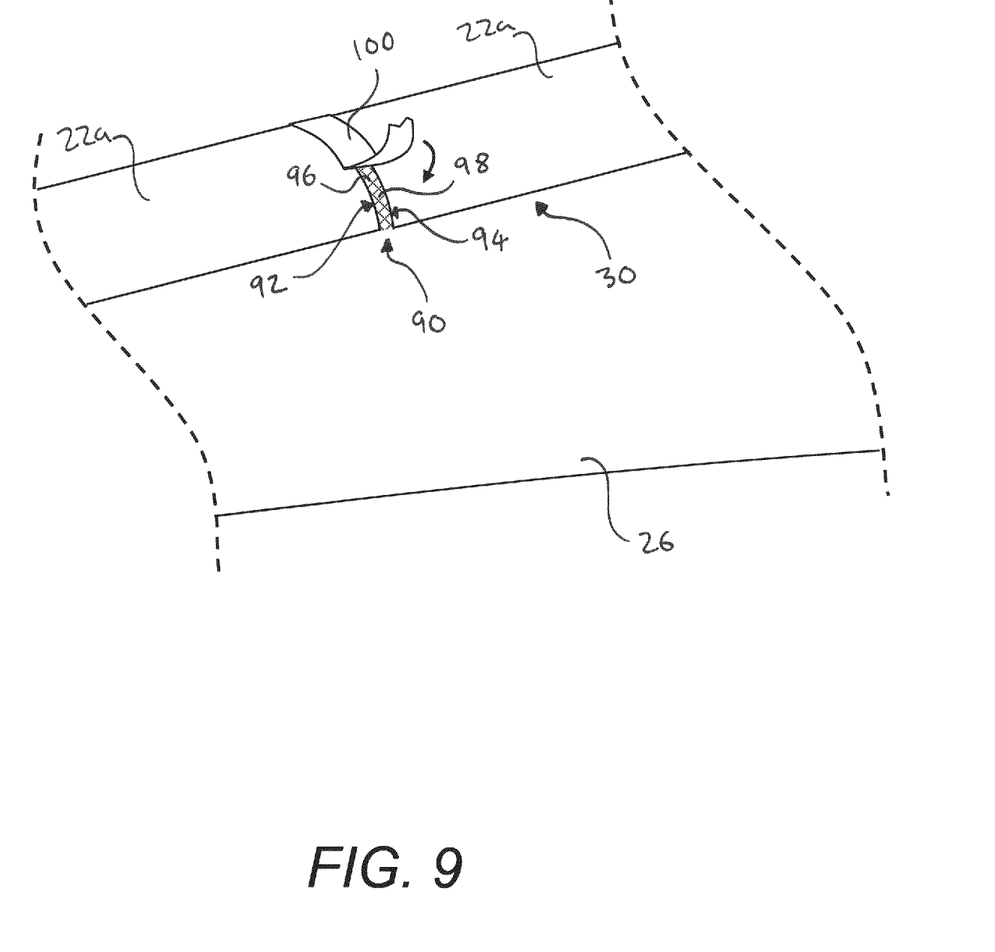
FIG. 9 is a further schematic perspective view of the wind turbine blade during application of the erosion shield comprising a plurality of shield sections.

FIG. 9 is a schematic perspective view of a further stage in the application method comprising arranging a plurality of shield sections 22a adjacent one another. Preferably there is no gap between the adjacent edges 92, 94 of adjacent shield sections 22a after forming the butt joint 90. In practice a small gap of less than 2 mm, preferably less than 1 mm, and most preferably less than 0.5 mm may be present between adjacent edges 92, 94 of adjacent shield sections 22a. Adhesive 96 is provided to the butt joint 90 between adjacent edges 92, 94 of adjacent shield sections 22a. Said adhesive 96 may be provided as the shield sections 22a are arranged against the leading edge region 30 of the blade shell 26 if excess adhesive from beneath the shield sections 22a is squeezed into the butt joint 90. Alternatively, the adhesive 96 could be provided by applying additional adhesive between the adjacent edges 92, 94 following arrangement of the shield sections 22a.

The adhesive 96 in the butt joint 90 may be shaped by scraping away any excess adhesive to provide a smooth outer surface 98. The adhesive 96 in the butt joint 90 is covered with a strip of removable tape 100 to maintain the shape of the adhesive 96 during curing thereof. The tape 100 further helps to protect the adhesive 96 in the butt joint 90 during curing. Following curing of the adhesive 96, the strip of tape is removed to provide a smooth aerodynamic transition between the adjacent shield sections 22a. After curing of the adhesive 96 and removal of the strip of tape 100, the method may further comprise applying a UV resistant coating to the outer surface 98 of the adhesive 96 in the butt joint 90.

The above described method provides an improved method of applying an erosion shield to a wind turbine blade. The method provides a solution in which adhesion between the erosion shield and the blade shell is increased such that a durable solution to leading edge protection can be achieved. Through using said application method, the erosion shield is capable of protecting the leading edge of the wind turbine blade for its entire projected use-period or significantly longer than present methods without delaminating from the blade in an early stage of use, thereby enabling effective protection of the leading edge from erosion.

Many modifications may be made to the examples described above without departing from the scope of the present invention as defined in the accompanying claims.

The invention claimed is:

1. A method of applying an erosion shield to a leading edge region of a wind turbine blade, the method comprising;
   providing the wind turbine blade comprising a blade shell having an aerodynamic profile and defining a leading edge region;
   providing an erosion shield made of a polymer material, the erosion shield having an inner surface to be bonded to the leading edge region of the blade shell, and an outer surface to be exposed in use;
   cleaning the inner surface of the erosion shield using a solvent;
   activating the inner surface of the erosion shield, wherein activating the inner surface of the erosion shield is performed after cleaning the inner surface of the erosion shield;
   applying a layer of wet adhesive to the inner surface of the erosion shield;
   applying a layer of wet adhesive to the leading edge region of the blade shell;
   arranging the erosion shield against the leading edge region of the blade shell such that wet-to-wet adhesive contact is established between the inner surface of the erosion shield and the blade shell; and
   curing the adhesive to bond the erosion shield to the leading edge region of the blade shell.

2. The method of claim 1, wherein wet-to-wet adhesive contact is established between the whole inner surface of the erosion shield and the blade shell.

3. The method of claim 1, wherein the inner surface of the erosion shield is activated using an abrasive having a grit rating of between 50 and 200.

4. The method of claim 1, wherein prior to applying the wet adhesive to the leading edge region of the blade shell, the method comprises activating the leading edge region and cleaning the leading edge region using a solvent, wherein cleaning the leading edge region is performed after activating the leading edge region.

5. The method of claim 1, wherein the adhesive is a two-part epoxy adhesive.

6. The method of claim 1, wherein prior to arranging the erosion shield against the leading edge region of the blade shell, the method further comprises;

applying a length of removable reinforcing tape along a longitudinal edge of the erosion shield to increase the stiffness of said longitudinal edge temporarily during arrangement of the erosion shield and curing of the adhesive.

7. The method of claim 1, the method further comprising;
providing adhesive in a sealing region of the blade shell, the sealing region being defined adjacent to a longitudinal edge of the erosion shield, and shaping the adhesive such that said adhesive forms a smooth transition between the longitudinal edge of the erosion shield and the blade shell;
covering the adhesive in the sealing region with a length of removable tape to maintain the shape of the adhesive and smooth transition between the erosion shield and blade shell during curing of said adhesive in the sealing region; and
following curing of the adhesive in the sealing region, removing the length of removable tape to provide a smooth aerodynamic transition from the outer surface of the erosion shield to the blade shell.

8. The method of claim 7, wherein a UV resistant coating is applied to an outer surface of the adhesive in the sealing region after removing the length of removable tape.

9. The method of claim 7, wherein after arranging the erosion shield against the leading edge region of the blade shell, the method further comprises;
arranging a bagging film over the erosion shield and/or sealing region; and
using a roller to smooth the erosion shield against the leading edge region, squeezing adhesive and air-pockets out from between the inner surface of the erosion shield and the blade shell.

10. The method of claim 1, wherein the erosion shield is made of a polyurethane material.

11. The method of claim 1, wherein the erosion shield comprises a plurality of longitudinally-extending shield sections, the method further comprising;
arranging the shield sections adjacent one another along the leading edge region of the blade shell; and
forming a butt joint between said adjacent shield sections such that adjacent edges of the adjacent shield sections do not overlap.

12. The method of claim 11, further comprising;
providing adhesive to the butt joint between adjacent edges of adjacent shield sections;
covering the adhesive in the butt joint between adjacent shield sections with a strip of removable tape to maintain the shape of the adhesive during curing thereof; and
removing said strip of removable tape following curing of the adhesive in the butt joint to provide a smooth aerodynamic transition between the adjacent shield sections.

13. The method of claim 12, further comprising applying a UV resistant coating to an outer surface of the adhesive in the butt joint following removal of the strip of removable tape.

14. The method of claim 1, the method further comprising:
pressing the erosion shield against the leading edge region of the blade shell such that some of the adhesive flows from an open longitudinal edge of the erosion shield to define a sealing region of the blade shell;
shaping the adhesive in the sealing region such that the adhesive forms a smooth transition between the longitudinal edge of the erosion shield and the blade shell; and
curing the adhesive in the sealing region.

* * * * *